United States Patent [19]
Nagai et al.

[11] Patent Number: 4,806,429
[45] Date of Patent: Feb. 21, 1989

[54] PLATE-LIKE BARIUM FERRITE PARTICLES SUITABLE FOR USE IN MAGNETIC RECORDING AND PROCESS FOR PRODUCING THE SAME

[75] Inventors: Norimichi Nagai; Akihiko Hirayama; Norio Sugita, all of Hiroshima; Masao Kiyama; Toshio Takada, both of Kyoto; Katsunori Fujimoto, Hiroshima; Yasutaka Ota, Saeki, all of Japan

[73] Assignee: Toda Kogyo Corporation, Hiroshima, Japan

[21] Appl. No.: 8,466

[22] Filed: Jan. 29, 1987

[30] Foreign Application Priority Data

Jan. 29, 1986 [JP] Japan ................. 61-18834
May 9, 1986 [JP] Japan ................. 61-107457

[51] Int. Cl.$^4$ .............................. B32B 5/16
[52] U.S. Cl. ..................... 428/403; 252/62.55; 252/62.56; 252/62.63; 427/217; 428/694; 428/900
[58] Field of Search ............. 428/403, 694, 900; 427/217, 127; 252/62.56, 62.55, 62.63

[56] References Cited

U.S. PATENT DOCUMENTS

| | | | |
|---|---|---|---|
| 4,529,524 | 7/1985 | Nagai et al. | 252/62.59 |
| 4,539,129 | 9/1985 | Nagai et al. | 252/62.63 |
| 4,539,261 | 9/1985 | Nakata et al. | 428/403 |
| 4,548,801 | 10/1985 | Nagai et al. | 252/62.63 |
| 4,561,988 | 12/1985 | Nagai et al. | 252/62.59 |
| 4,584,242 | 4/1986 | Nagai et al. | 428/403 |
| 4,585,568 | 4/1986 | Nagai et al. | 252/62.59 |
| 4,585,697 | 4/1986 | Kato et al. | 428/403 |
| 4,622,159 | 11/1986 | Licci et al. | 252/62.63 |
| 4,664,831 | 5/1987 | Hibst et al. | 252/62.56 |
| 4,683,167 | 7/1987 | Scott et al. | 428/403 |

FOREIGN PATENT DOCUMENTS 0092394 10/1983 European Pat. Off. .
0123445 10/1984 European Pat. Off. .
0141558 5/1985 European Pat. Off. .

OTHER PUBLICATIONS

Patent Abstracts of Japan, vol. 7, No. 142 (P. 205) [1287].

*Primary Examiner*—Paul J. Thibodeau
*Attorney, Agent, or Firm*—Cushman, Darby & Cushman

[57] ABSTRACT

Disclosed herein are plate-like barium ferrite particles with a solid solution of zinc on the surface thereof, which have an average particle diameter of 0.05 to 0.3 μm, a coercive force of 300 to 1,500 Oe and a magnetization of not less than 55 emu/g in magnetic field of 10 KOe, and which are represented by the following formula (I):

$$BaO \cdot n[(Fe_{1-2x}Co_xTi_x)_2O_3] \qquad (I)$$

wherein x is 0 to 0.1 and n is from 4 to 11, the molar ratio of Ti to Co being 1, and a process for producing the plate-like barium ferrite particles.

3 Claims, 3 Drawing Sheets (×100,000)

(×100,000)

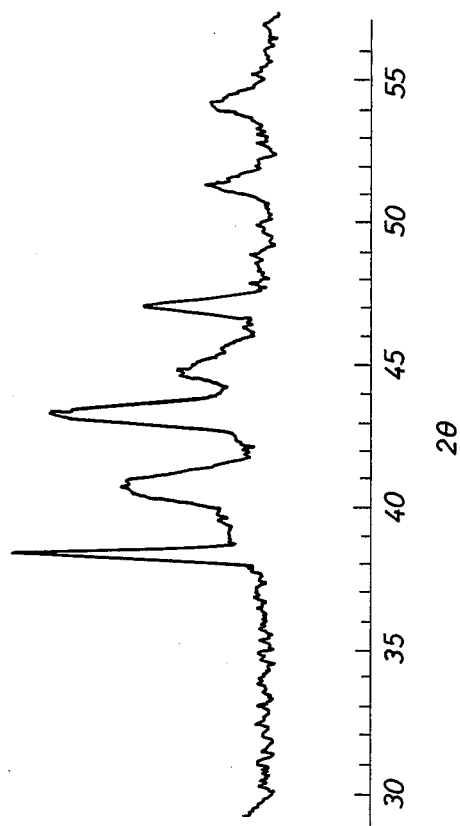

PLATE-LIKE BARIUM FERRITE PARTICLES SUITABLE FOR USE IN MAGNETIC RECORDING AND PROCESS FOR PRODUCING THE SAME

BACKGROUND OF THE INVENTION

The present invention relates to plate-like barium ferrite particles suitable for use in magnetic recording, on which the surface thereof a solid solution of zinc is formed and a process for producing the same. The present invention relates, more particularly, to plate-like barium ferrite particles with a solid solution of zinc on the surface thereof, which have an average particle diameter of not less than 0.05 μm and less than 0.3 μm, a coercive force (Hc) of 300 to 1500 Oe and a magnetization (M) of not less than 55 emu/g in magnetic field of 10 KOe, and relates to a process for producing plate-like ferrte particles suitable for use in magnetic recording comprising the steps of: autoclaving an aqueous alkaline suspension of iron hydroxide (III) containing Ba ions and.optionaly Co compound and Ti compound in molar ratio of Ti/Co=1, at a temperature of from 120° to 330° C., suspending the thus obtained plate-like barium ferrite particles in an aqueous solution containing zinc of pH 4.0 to 12.0 so as to deposit zinc hydroxides on the surface of the plate-like barium particles, filtering out and drying the particles, and then baking the thus obtained particles at a temperature of 600° to 900° C., to form a solid solution of zinc on the surface of the plate-like barium ferrite particles.

As described, for example, in Japanese Patent Application Laying-Open (KOKAI) No. 55-86103 (1980), ferro-magnetic non-acicular particles having a large magnetization, an appropriate coercive force and an appropriate average particle size have recently been demanded as a magnetic recording material, in particular, as a perpendicular magnetic recording material.

Generally, barium ferrite particles are known as ferromagnetic non-acicular particles.

Hitherto, as a process for producing plate-like barium ferrite, a method of autoclaving an aqueous alkaline suspension containing Ba ions and Fe(III) by using an autoclave as a reaction apparatus (this method is hereinafter referred to as "autoclaving") is known.

With respect to magnetic properties, the magnetization (M) of plate-like barium ferrite particles must be as large as possible, as is described in the specification of Japanese Patent Application Laying-Open (KOKAI) No. 56-149328 (1981); "... the magneto plumbite ferrite which is used as a magnetic recording material is required to have the greatest possible saturation magnetization ... "

A coercive force of about 300 to 1,500 Oe is generally required, and in order to reduce the coercive force of the produced barium ferrite particles to an appropriate coercive force in the autoclaving process, a method of substituting a part of Fe(III) in ferrite by Ti(IV) and Co(II), or Co(II) and bivalent metal ions M(II) of Mn, Zn, Ni or the like has been proposed.

For example, European Patent No. 0123445 A discloses "plate-like barium ferrite particles which are represented by the formula $BaCo_xTi_yFe_{12-x-y}O_{19}$ wherein x and y independently are numbers from 0.1 to 0.5 and which have a BET specific surface area ofd from 20 to 70 $m^2/g$, an average particle diameter of from 0.05 to 0.3 μm, a magnetization of larger than 30 emu/g in a magnetic field of $7.96 \times 10^5$ A $m^{-1}$ (10 KOe) and a coercive force of from $2.39 \times 10^4$ to $7.96 \times 10^4$ A $m^{-1}$ (300 to 1,000 Oe)", and "a process for producing plate-like barium ferrite particles represented by the formula:

$$BaCo_xTi_yFe_{12-x-y}O_{19}$$

wherein x and y independently are numbers from 0.1 to 0.5, which process comprises autoclaving at a temperature of from 250° to 320° C. an aqueous alkaline suspension containing Fe(III), Co(II), Ti(IV) and Ba ions and a molar excess with respect to the total amount of Fe(III), Co(II), Ti(IV) and Ba ions of an alkali metal hydroxide, and in which suspension the atomic ratio of the total amount of Co(II) and Ti(IV) to the amount of Fe(III) is from 0.017:1 to 0.09:1 and the atomic ratio of Ba ions to the total sum of Fe(III), Co(II) and Ti(IV) is from 1:7 to 1:9".

The particle size of plate-like barium ferrite particles for use in magnetic recording is required to be as fine as possible, in particular, to be not greater than 0.3 μm.

This fact is described, for example, in Japanese Patent Application Laying-Open (KOKAI) No. 56-125219 (1981); " ... perpendicular magnetic recording is effective in relation to horizontal recording in the region in which the recording wavelength is less than 1 μm. In order to sufficiently record and reproduce in this wavelength region, the crystalline particle diameter of the ferrite is preferably substantially less than 0.3 μm. However, if the particle diameter is about 0.01 μm, the desired coercive force is not exhibited. Therefore, a crystalline particle diameter of 0.01 to 0.3 μm is appropriate".

Plate-like barium ferrite particles having a large magnetization, an appropriate coercive force and an appropriate particle size have now been strongly demanded.

In autoclaving, different barium ferrite particles are precipitated depending upon the selected reaction condition. The precipitated particles have ordinarily a hexagonal plate-like configuration, and their particle size, and magnetic properties are different depending upon the producing condition. It is therefore difficult to obtain plate-like barium ferrite particles having an average particle size of 0.05 to 0.3 μm and a coercive force (Hc) of not more than 1,500 Oe, while maintaining the magnetization of not less than 55 emu/g.

As a method of solving this problem, a method of baking plate-like barium ferrite particles produced from an aqueous solution by autoclaving at a temperature of more than 800° C. to improve the magnetization is conventionally known [Japanese Patent Publication No. 60-12973 (1980)].

In this method, however, the magnetization tends to increase with the rise in baking temperature, and a high temperature of more than 900° C. is required in order to obtain a large magnetization, in particular, a magnetization of not less than 55 emu/g. In the case of baking at more than 900° C., sintering between the particles is so marked as to bulk, these formed bulk particles being unfavorable as magnetic particles for use in magnetic recording.

In order to control the coercive force (Hc) of the plate-like barium ferrite particles obtained by baking so as to be less than 1,500 Oe, a large quantity of the above-described coercive force reducing agent must be added, resulting in cause of the magnetization to be lowered. Thus, it is difficult to control the coercive force (Hc) in the range of 300 to 1,500 Oe while maintaining the magnetization at a large value, in particular, at not less than 55 emu/g.

In autoclaving are known a method of adding zinc in the producing reaction of plate-like barium ferrite particles [for example, Japanese Patent Publication Nos. 46-3545 (1971) and 60-12973 (1985)] and a method of coating the surfaces of plate-like barium ferrite particles with the oxide and/or the hydroxide of zinc [Japanese Patent Application Laying-Open (KOKAI) No. 58-56232 (1983)]. By any of these methods, it is difficult to obtain plate-like barium ferrite particles having a large magnetization (M) and a coercive force (Hc) of 300 to 1,500 Oe.

Thus, the offer of plate-like barium ferrite particles having a large magnetization, an appropriate coercive force and an appropriate average particle size as a magnetic material for magnetic recording, in particular, as a perpendicular magnetic recording material have been strongly demanded.

As a result of various studies on a process for producing plate-like barium ferrite particles having a large magnetization and an average particle size of 0.05 to 0.3 $\mu$m by autoclaving, it has been found that plate-like barium ferrite particles having a magnetization (M) of not less than 55 emu/g and a coercive force (Hc) of 300 to 1,500 Oe by suspending plate-like barium ferrite particles produced from an aqueous solution in an aqueous solution containing zinc of pH 4.0 to 12.0 to obtain the plate-like barium ferrite particles deposited with the zinc hydroxide on the surfaces thereof, filtering out and drying the particles, and thereafter baking the particles at a temperature of 600° to 900° C. to form a solid solution of zinc on the surfaces of the plate-like barium ferrite particles, and based on the finding the prevent invention has been attained.

SUMMARY OF THE INVENTION

In a first aspect of the present invention, there is provided plate-like barium ferrite particles with a solid solution of zinc of the surface thereof, which have an average particle diameter of 0.05 to 0.3 $\mu$m, a coercive force of 300 to 1,500 Oe and a magnetization of not less than 55 emu/g in magnetic field of 10 KOe, and which are represented by the following formula (I):

$$BaO \cdot n[(Fe_{1-2x}Co_xTi_x)_2O_3] \qquad (I)$$

wherein x is 0 to 0.1 and n is from 4 to 11, the molar ratio of Ti to Co being 1.

In a second aspect of the present invention, there is provided a process for producing plate-like barium ferrite particles with a solid solution of zinc on the surface thereof, which are represented by the following formula (I):

$$BaO \cdot n[(Fe_{1-2x}Co_xTi_x)_2O_3] \qquad (I)$$

wherein x is 0 to 0.1 and n is from 4 to 11, the molar ratio of Ti to Co being 1, which comprises autoclaving at a temperature of from 120° to 330° C. an aqueous alkaline suspension of iron hydroxide (III) containing Ba ions and optionaly Co(II), Ti(IV), and a molar excess with respect to the total amount of Fe(III), Co(II), Ti(IV) and Ba ions of an alkali metal hydroxide, in said suspension the molar ratio of Ti to Co being 1, suspending the thus obtained plate-like barium ferrite particles in an aqueous solution containing zinc of pH 4.0 to 12.0 to deposit the zinc hydroxide on the surface of said plate-like barium ferrite particles, filtering out and drying the plate-like barium ferrite particles deposited with the zinc hydroxide on the surfaces thereof, and baking the particles obtained at a temperature of 600° to 900° C., thereby form a solid solution of zinc in the surface of said plate-like barium ferrite particles.

BRIEF DESCRIPTION OF THE DRAWINGS

FIGS. 1 and 4 show an X-ray diffraction pattern of the plate-like barium ferrite particles with a solid solution of zinc, obtained in Examples 1 and 3, respectively;

DESCRIPTION OF THE PREFERRED EMBODIMENTS

Figure 1:
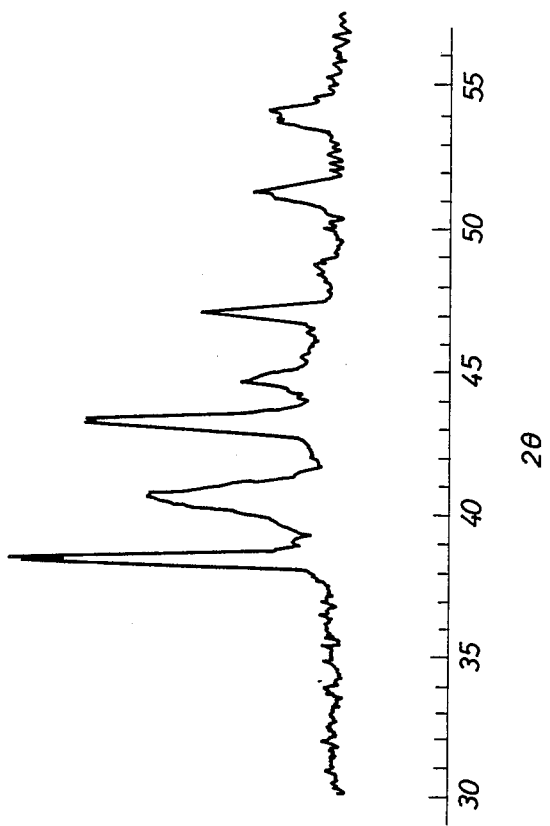

Plate-like barium ferrite particles suitable for use in magnetic recording according to the present invention, which have an average particle diameter of 0.05 to 0.3 $\mu$m a coercive force of 300 to 1,500 Oe and a magnetization of not less than 55 emu/g in a magnetic field of 10 KOe, and which are represented by the following formula (I):

$$BaO \cdot n[(Fe_{1-2x}Co_xTi_x)_2O_3] \qquad (I)$$

wherein x is from 0 to 0.1 and n is from 4 to 11, the molar ratio of Ti to Co being 1, and on which the surface thereof a solid solution of zinc is formed, are obtained by the following process.

The plate-like barium ferrite particles and optionally containing Co and Ti are first produced by autoclaving an aqueous alkaline suspension of iron hydroxide (III) containing Ba ions and optionaly Co compound and Ti compound in molar ratio of Ti/Co=1, at a temperature ranging from 120° to 330° C. The thus obtained plate-like barium ferrite particles is suspended in an aqueous solution containing zinc of pH 4.0 to 12.0 to deposit the zinc hydroxide on the surface of the plate-like barium particles and optionaly containing Co and Ti, and after filtering out and drying, the thus obtained plate-like barium ferrite particles are baked at a temperature of 600° to 900° C.

Namely, the heart of the present is characterized in that plate-like barium ferrite particles having an average particle diameter of not more than 0.3 $\mu$m produced by autoclaving an aqueous alkaline suspension of iron hydroxide (III) containing Ba ions and optionaly Co compound and Ti compound in molar ratio of Ti/Co=1, at a temperature ranging from 120° to 330° C. are suspended in an aqueous solution containing zinc of pH 4.0 to 12.0, thereby obtaining plate-like barium ferrite particles and optionaly containing Co and Ti, on which surface thereof the zinc hydroxide is deposited; and that after filtering out and drying, the thus obtained plate-like barium ferrite particles containing Co and Ti are baked at a temperature of 600° to 900° C. to form a solid solution of zinc on the surface thereof, thereby enabling the magnetization of the plate-like barium ferrite particles and optionaly containing Co and Ti to effectively increase at a baking temperature below 900° C.

A method of adding a Co compound and a Ti compound when producing plate-like barium ferrite particles by autoclaving is conventionally known, as is disclosed in, e.g., Japanese Patent Application Laying-Open (KOKAI) No. 56-149328 (1981).

In the present invention, since it is possible to reduce the amount of a coercive force reducing agent to be added, which will cause the magnetization to be lowered on the basis of the finding that it is possible to effectively increase the magnetization and to lower the coercive force of plate-like barium ferrite particles by forming a solid solution of zinc on the surfaces of the plate-like barium ferrite particles, it is possible to effectively control the coercive force in the range of 300 to 1,500 Oe while retaining a large magnetization.

The reason why it is possible to effectively increase the magnetization and to control the coercive force while maintaining a large magnetization is considered to be that a solid solution of zinc is formed on the surfaces of the plate-like barium ferrite particles, in consideration of the fact that the effects of the present invention cannot be obtained by either a method of adding zinc during production reaction of plate-like barium ferrite particles in autoclaving or a method of coating the surfaces of plate-like barium ferrite particles with the oxide and/or the zinc hydroxide, as is shown in Comparative Examples.

In the present invention, in the case where the amount of solid solution of zinc on the surfaces of plate-like barium ferrite particles increases, the magnetization effectively increases and the coercive force reduces.

The amount of a solid solution of zinc on the surfaces of plate-like barium ferrite particles is controlled by adjusting the pH of the solution at the time of depositing the zinc hydroxide on the surface of the particles and the amount of zinc to be added.

The amount of deposition of the zinc hydroxide on the surfaces of the particles has a tendency of increasing with the increase in pH, and preferable pH is in the range of 4 to 12 and more preferable pH is in the range of 8 to 10.

As the Fe(III) salt in the present invention, iron nitride, iron chloride, or the like may be used.

As the Ba ions in the present invention, barium hydroxide, barium chloride, barium nitride or the like may be used.

The reaction temperature in autoclaving in the present invention is 120° to 330° C.

If it is below 120° C., it is difficult to produce plate-like barium ferrite particles.

Although it is possible to produce plate-like barium ferrite particles even if it exceeds 330° C., the upper limit is determined to be 330° C. in consideration of the safety of the apparatus.

As the Co compound in the present invention, cobalt chloride, cobalt nitride or the like may be used.

The Co compound is added so as x is not more than 0.1 the final product represented by the formula:

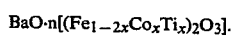

Although it is possible to produce plate-like barium ferrite particles having a particle diameter of not more than 0.3 μm in the case of non-baking even if x exceeds 0.1, there is no use in adding more Co compound than required.

The Ti compound used in the present invention includes titanium chloride, titanium oxysulfide and alkali titanium.

The amount of Ti compound is added so as x is not more than 0.1 in the final product represented by the formula:

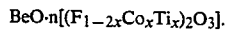

The plate-like barium ferrite particles obtained in this way are represented by the formula:

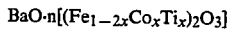

wherein n is 4 to 11 and x is 0 to 0.1, Co (molar ratio) being 1. As representative plate-like barium ferrite particles according to the present invention, plate-like barium ferrite particles represented by the formula:

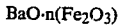

wherein n is 4 to 11, and plate-like barium ferrite particles represented by the formula:

$BaO \cdot n[(Fe_{1-2x}Co_xTi_x)_2O_3]$ wherein n is 4 to 11 and x is from more than 0 to not more than 0.1, Ti/Co (molar ratio) being 1 may be exemplified.

The zinc hydroxide in the present invention is deposited by suspending plate-like barium ferrite particles in an aqueous solution containing zinc of pH 4.0 to 12.0, preferably pH 8 to 10.

As the zinc compound of the present invention, a halide such as zinc chloride, zinc bromide and zinc iodide; zinc nitride; zinc sulfide; zinc acetate or the like may be used.

If the pH is less than 4 or more than 12, deposition of zinc is difficult.

The baking temperature in the present invention is 600° to 900° C., preferably 700° to 850° C.

If it is below 600° C., a solid solution of zinc on the surfaces of plate-like barium ferrite particles is insufficient.

If it is above 900° C., since sintering between the particles is too remarkable.

The plate-like barium ferrite particles according to the present invention after baking have a coercive force (Hc) of 300 to 1,500 Oe and a magnetization (M) of not less than 55 emu/g in magnetic field of 10 KOe.

The surfaces of the plate-like barium ferrite particles may be coated with a compound showing an antisintering effect such as an Si compound, Al compound and P compound before baking.

The amount of a solid solution of zinc with respect to plate-like barium ferrite particles of the present invention is 0.2 to 5.0 wt %, preferably 0.7 to 4.5 wt %.

If it is less than 0.2 wt %, it is impossible to sufficiently achieve the object of the present invention.

Although it is possible to achieve the object of the present invention even if it is more than 5.0 wt %, there is no use in adding a larger amount of zinc than necessary.

Since the plate-like barium ferrite particles with a solid solution of zinc on the surface thereof according to the present invention, represented by the formula:

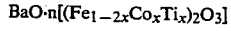

wherein n is 4 to 11 and x is 0 to 0.1, Ti/Co (molar ratio) being 1, have an average particle diameter of 0.05 to 0.3 μm, a magnetization (M) of not less than 55 emu/g, preferably not less than 57 emu/g, in magnetic field of 10 KOe, and a coercive force (Hc) of 300 to 1,500 Oe, preferably 400 to 1,300 Oe, they are suitable as a magnetic material for magnetic recording, especially, as a perpendicular magnetic recording material.

The present invention will now be explained with reference to the following examples and comparative examples.

The average particle diameter and the specific surface area in each of the examples and comparative examples are represented by the values measured from an electron microphotograph.

The magnetization (M) and the coercive force (Hc) of the particles were measured in the form of powders in magnetic field of 10 KOe.

EXAMPLE 1

Plate-like barium ferrite particles obtained by autoclaving were used as the starting material.

100 g of the starting material were dispersed and mixed in an aqueous solution containing 0.1 mol of zinc nitrate, and after the zinc hydroxide was deposited on the surfaces of the particles when the pH of the solution was 6.0, the particles were filtered out, dried and then baked at 750° C. for 1.5 hours.

The plate-like barium ferrite particles which were obtained by baking had an average particle diameter of 0.2 μm, a coercive force Hc of 980 Oe and a magnetization of 64.5 emu/g.

When the plate-like barium ferrite particles were diffracted by an X-ray, only the peaks that represent a magneto plumbite structure were observed as shown in FIG. 1, and as a result of chemical analysis of the particles, no oxide or hydroxide of zinc was detected which is to be extracted with heating from an alkaline solution. From these facts it was confirmed that zinc a solid solution of had been formed. According to X-ray fluorescence analysis, the quantity of the solid solution of zinc was 3.1 wt %, and the composition of the thus obtained plate-like barium ferrite particle with a solid solution of zinc is represented by $BaO7.3Fe_2O_3$.

Comparative Example 1

The same process as that in Example 1 was repeated without depositing the zinc hydroxide to obtain plate-like barium ferrite particles. The plate-like barium ferrite particles obtained had an average particle diameter of 0.2 μm, a coercive force Hc of 2200 Oe and a magnetization of 57.0 emu/g.

EXAMPLE 2

100 g of the starting material in Example 1 were dispersed and mixed in an aqueous solution containing 0.07 mol of zinc chloride, and after the zinc hydroxide was deposited on the surfaces of the particles when the pH of the solution was 8.0, the particles were filtered out, dried and then baked at 800° C. for 2 hours.

The plate-like barium ferrite particles with a solid solution of zinc which were obtained by baking had an average particle diameter of 0.18 μm, a coercive force Hc of 1120 Oe and a magnetization of 61.3 emu/g.

When the plate-like barium ferrite particles with a solid solution of zinc were diffracted by an X-ray, only the peaks that represent a magneto plumbite structure were observed, and as a result of chemical analysis of the particles, no oxide or hydroxide of zinc was detected which is to be extracted with heating from an alkaline solution. From these facts it was confirmed that zinc a solid solution of had been formed. According to X-ray fluorescence analysis, the quantity of the solid solution of zinc was 3.0 wt %, and the composition of the plate-like barium ferrite particles with a solid solution of zinc is represented by $BaO.6.4Fe_2O_3$.

Comparative Example 2

The same process as that in Example 2 was repeated without depositing the zinc hydroxide to obtain plate-like barium ferrite particles. The plate-like barium ferrite particles obtained had an average particle diameter of 0.18 μm, a coercive force Hc of 2490 Oe and a magnetization of 54.5 emu/g.

EXAMPLE 3

Figure 2:
FIG. 2 is electron microphotographs ($\times$100,000) of the particle structures of the plate-like barium ferrite particles produced from an aqueous solution in Example 3.

As is clear from the electron microphotograph (×100,000) in FIG. 2, plate-like barium ferrite particles containing 8.6 atomic % of Co and 8.6 atomic % of Ti with respect to Fe were used as the starting material. 100 g of the starting material was dispersed and mixed in an aqueous solution containing 0.07 mol of zinc chloride, and after the zinc hydroxide was deposited on the surfaces of the particles when the pH of the solution was 6.0, the particles were filtered out, dried and then baked at 800° C. for 2.0 hours.

Figure 3:
FIG. 3 is electron microphotograph ($\times$100,000) of the particle structures of the plate-like barium ferrite particles obtained by baking in Example 3.

The particles obtained by baking had an average particle diameter of 0.12 μm as is clear from the electron microphotograph (×100,000) in FIG. 3. With respect to the magnetic properties, the coercive force (Hc) was 310 Oe and the magnetization (M) was 57.5 emu/g.

As a result of X-ray fluorescence analysis, it was found that the particles contained 2.9 wt % of Zn.

When the plate-like barium ferrite particles were diffracted by an X-ray, only the peaks that represent a magneto plumbite structure were observed, as is clear from FIG. 4, and as a result of chemical analysis of the particles, no oxide or hydroxide of zinc was detected which is to be extracted with heating from an alkaline solution. From these facts it was confirmed that a solid solution zinc had been formed on the surface of the particles. According to X-ray fluorescence analysis, the composition of the thus obtained plate-like barium ferrite particles with a solid solution of zinc is represented by $BaO.8.2[(Fe_{0.854}Co_{0.073}Ti_{0.073})_2O_3]$

Comparative Example 3

The same process as that in Example 3 was carried out except for depositing the zinc hydroxide to obtain plate-like barium ferrite particles containing Co and Ti. The plate-like barium ferrite particles obtained had an average particle diameter of 0.12 μm, a coercive force (Hc) of 460 Oe and a magnetization of 53.8 emu/g.

EXAMPLE 4

Plate-like barium ferrite particles containing 3.6 atomic % of Co and 3.6 atomic % of Ti with respect to Fe were used as the starting material. 100 g of the starting material was dispersed and mixed in an aqueous solution containing 1.0 mol of zinc sulfite, and after the zinc hydroxide was deposited on the surface of the particles when the pH of the solution was 8.0, the particles were filtered out, dried and then baked at 850° C. for 2.0 hours. The particles obtained by baking had an average particle diameter of 0.10 μm. With respect to the magnetic properties, a coercive force (Hc) was 611 Oe and a magnetization (M) was 59.3 emu/g.

As a result of X-ray fluorescence analysis, it was found that the particles contained 4.0 wt % of Zn.

When the plate-like barium ferrite particles were diffracted by an X-ray, only the peaks that represent a magneto plumbite structure were observed, and as a result of chemical analysis of the particles, no oxide or hydroxide of zinc was detected which is to be extracted with heating from an alkaline solution. From these facts it was confirmed that a solid solution zinc had been formed on the surface of the particles. According to X-ray fluorescence analysis, the composition of the thus obtained plate-like barium ferrite particles with a solid solution of zinc is represented by $BaO\cdot9.2[(Fe_{0.932}Co_{0.034}Ti_{0.034})_2O_3]$

Comparative Example 4

The same process as that in Example 4 was carried out except for depositing the zinc hydroxide to obtain plate-like barium ferrite particles containing Co and Ti. The plate-like barium ferrite particles obtained had an average particle diameter of 0.10 μm, a coercive force (Hc) of 1490 Oe and a magnetization of 52.2 emu/g.

EXAMPLE 5

Plate-like barium ferrite particles containing 3.6 atomic % of Co and 3.6 atomic % of Ti with respect to Fe were used as the starting material. 100 g of the starting material was dispersed and mixed in an aqueous solution containing 0.03 mol of zinc sulfite, and after the zinc hydroxide was deposited on the surface of the particles when the pH of the solution was 8.0, the particles were filtered out, dried and then baked at 800° C. for 2.0 hours. The particles obtained by baking had an average particle diameter of 0.10 μm. With respect to the magnetic properties, a coercive force (Hc) was 1290 Oe and a magnetization (M) was 57.8 emu/g.

As a result of X-ray fluorescence analysis, it was found that the particles contained 1.3 wt % of Zn.

When the plate-like barium ferrite particles were diffracted by an X-ray, only the peaks that represent a magneto plumbite structure were observed, and as a result of chemical analysis of the particles, no oxide or hydroxide of zinc was detected which is to be extracted with heating from an alkaline solution. From these facts it was confirmed that a solid solution zinc had been formed on the surface of the particles. According to X-ray fluorescence analysis, the composition of the thus obtained plate-like barium ferrite particles with a solid solution of zinc is represented by $BaO\cdot7.6[(Fe_{0.932}Co_{0.034}Ti_{0.034})_2O_3]$.

EXAMPLE 6

Plate-like barium ferrite particles containing 10.0 atomic % of Co and 10.0 atomic % of Ti with respect to Fe were used as the starting material. 100 g of the starting material was dispersed and mixed in an aqueous solution containing 0.02 mol of zinc sulfite, and after the zinc hydroxide was deposited on the surface of the particles when the pH of the solution was 9.0, the particles were filtered out, dried and then baked at 700° C. for 2.0 hours. The particles obtained by baking had an average particle diameter of 0.14 μm. With respect to the magnetic properties, a coercive force (Hc) was 482 Oe and a magnetization (M) was 58.2 emu/g.

As a result of X-ray fluorescence analysis, it was found that the particles contained 1.0 wt % of Zn.

When the plate-like barium ferrite particles were diffracted by an X-ray, only the peaks that represent a magneto plumbite structure were observed, and as a result of chemical analysis of the particles, no oxide or hydroxide of zinc was detected which is to be extracted with heating from an alkaline solution. From these facts it was confirmed that a solid solution zinc had been formed on the surface of the particles. According to X-ray fluorescence analysis, the composition of the thus obtained plate-like barium ferrite particles with a solid solution of zinc is represented by $BaO\cdot6.4[(Fe_{0.834}Co_{0.083}Ti_{0.003})_2O_3]$.

Comparative Example 5

The same process as that in Example 6 was carried out except for depositing the zinc hydroxide to obtain plate-like barium ferrite particles containing Co and Ti. The plate-like barium ferrite particles obtained had an average particle diameter of 0.14 μm, a coercive force (Hc) of 650 Oe and a magnetization of 53.1 emu/g.

What is claimed is:

1. Plate-like barium ferrite particles with a solid solution of zinc on the surface thereof, which have an average particle diameter of 0.05 to 0.3 μm, a coercive force of 300 to 1,500 Oe and a magnetization of not less than 55 emu/g in magnetic field of 10 KOe, and which are represented by the following formula (1)

$$BaO\cdot n[(Fe_{1-2x}Co_xTi_x)_2O_3] \qquad (I)$$

wherein x is 0 to 0.1 and n is from 4 to 11, the molar ratio of Ti to Co being 1.

2. Plate-like barium ferrite particles according to claim 1, wherein the quantity of a solid solution of zinc with respect to the plate-like barium ferrite particles with the solid solution of zinc on the surface thereof is 0.2 to 5.0 wt % (calculated as Zn).

3. Plate-like barium ferrite particles according to claim 1, wherein a magnetization is not less than 57 emu/g.

* * * * *